US011823184B2

(12) United States Patent
Rice et al.

(10) Patent No.: US 11,823,184 B2
(45) Date of Patent: *Nov. 21, 2023

(54) METHOD AND SYSTEM FOR ISSUER-DEFINED PROMPTS AND DATA COLLECTION

(71) Applicant: MASTERCARD INTERNATIONAL INCORPORATED, Purchase, NY (US)

(72) Inventors: Enda Rice, Wezembeek-Oppem (BE); Eddy Van De Velde, Leuven (BE); Sebastien Pochic, Brussels (BE); Mark Aquilina, Denver, CO (US); Charl Frederik Botes, Mamaroneck, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 8 days.

This patent is subject to a terminal disclaimer.

(21) Appl. No.: 17/477,717

(22) Filed: Sep. 17, 2021

(65) Prior Publication Data

US 2022/0005035 A1 Jan. 6, 2022

Related U.S. Application Data

(62) Division of application No. 15/463,045, filed on Mar. 20, 2017, now Pat. No. 11,151,560.

(51) Int. Cl.
*G06Q 20/40* (2012.01)
*G06Q 20/34* (2012.01)
(Continued)

(52) U.S. Cl.
CPC .......... *G06Q 20/401* (2013.01); *G06Q 20/20* (2013.01); *G06Q 20/34* (2013.01); *G06Q 20/356* (2013.01);
(Continued)

(58) Field of Classification Search
CPC ...... G06Q 20/401; G06Q 20/20; G06Q 20/34; G06Q 20/356; G06Q 2220/00; G07F 9/02; G07G 1/0009; H04L 9/50
See application file for complete search history.

(56) References Cited

U.S. PATENT DOCUMENTS 6,422,462 B1 7/2002 Cohen
10,692,059 B1* 6/2020 Thome ............... G06Q 20/3221
(Continued)

FOREIGN PATENT DOCUMENTS

EP 1575005 A2 9/2005
WO 0103081 A1 1/2001

OTHER PUBLICATIONS

Office Action {Communication pursuant to Article 94(3) EPC} dated Jan. 12, 2021, by the European Patent Office in corresponding European Patent Application No. 18 710 274.4-1213. (8 pages).
(Continued)

*Primary Examiner* — James D Nigh
*Assistant Examiner* — Chunling Ding
(74) *Attorney, Agent, or Firm* — Panitch Schwarze Belisario & Nadel LLP

(57) ABSTRACT

A method for providing scripts for execution as part of an electronic transaction includes: storing, in a memory of an integrated circuit payment card, at least one or more executable scripts, payment credentials, and a cryptogram rule; receiving, by a receiving device of the integrated circuit payment card, a transaction request from a point of sale device, wherein the transaction request includes at least one or more transaction items and a script request; generating, by a generation module of the integrated circuit payment card, at least one payment cryptogram based on at least the cryptogram rule and at least one of the one or more transaction items; and electronically transmitting, by a transmitting device of the integrated circuit payment card, at least
(Continued)

one of the one or more executable scripts, the payment credentials, and the generated at least one payment cryptogram to the point of sale device.

10 Claims, 9 Drawing Sheets

(51) Int. Cl.
    *G06Q 20/20*         (2012.01)
    *G07G 1/00*          (2006.01)
    *G07F 9/02*          (2006.01)

(52) U.S. Cl.
    CPC .............. *G07F 9/02* (2013.01); *G07G 1/0009* (2013.01); *G06Q 2220/00* (2013.01)

(56) References Cited

U.S. PATENT DOCUMENTS

| | | |
|---|---|---|
| 2003/0074254 A1 | 4/2003 | Iijima |
| 2004/0172339 A1* | 9/2004 | Snelgrove .............. G06Q 40/00 705/26.1 |
| 2005/0015275 A1* | 1/2005 | Takekawa ............. G07F 7/1008 717/172 |
| 2007/0012763 A1 | 1/2007 | Van et al. |
| 2010/0211445 A1 | 8/2010 | Bodington |
| 2012/0317035 A1* | 12/2012 | Royyuru ............... G06Q 20/382 705/16 |
| 2013/0317927 A1* | 11/2013 | Bush .................... G06Q 20/326 705/21 |
| 2014/0156535 A1* | 6/2014 | Jabbour ................. G06Q 20/34 705/72 |
| 2014/0289129 A1 | 9/2014 | Savolainen et al. |
| 2015/0127529 A1* | 5/2015 | Makhotin ............. G06Q 20/322 705/39 |
| 2015/0178694 A1 | 6/2015 | Chang et al. |
| 2016/0092872 A1* | 3/2016 | Prakash ............... G06Q 20/322 705/65 |
| 2016/0253663 A1 | 9/2016 | Clark et al. |
| 2016/0335625 A1 | 11/2016 | Ko et al. |
| 2017/0046679 A1 | 2/2017 | Gotlieb et al. |
| 2017/0236130 A1* | 8/2017 | Kee ......................... G06F 16/93 705/7.26 |
| 2018/0018661 A1* | 1/2018 | Murphy ............. G06Q 20/3829 |
| 2018/0018672 A1 | 1/2018 | Shauh |
| 2019/0139351 A1* | 5/2019 | Chambero ......... G06Q 20/3227 |
| 2019/0378107 A1 | 12/2019 | Bhattacharjee et al. |

OTHER PUBLICATIONS

Notification of Transmittal of the International Search Report and the Written Opinion of the International Searching Authority (Forms PCT/ISA/220, PCT/ISA/210 and PCT/ISA/237) dated Apr. 30, 2018, by the European Patent Office in corresponding International Application No. PCT/US2018/019870. (13 pages).

* cited by examiner

METHOD AND SYSTEM FOR ISSUER-DEFINED PROMPTS AND DATA COLLECTION

FIELD

The present disclosure relates to the use of issuer-defined prompts at a point of sale device during an electronic transaction for data collection, specifically the inclusion of executable scripts on an integrated circuit payment card or other device for conveyance to the point of sale device for execution to display the issuer-defined prompts and to extract static data from the card or device.

BACKGROUND

Issuers and other financial institutions issue a wide variety of different payment instruments and payment products to enable their customers to conduct secure payment transactions in a manner most suitable to their goals and objectives. For instance, a parent may establish a transaction account with multiple payment cards that can be controlled during usage, such as for placing limits on their spending and spending of their children. In another example, a business owner may get a transaction account that is configured for use in business-to-business transactions that offers specialized accounting to assist in management of their business. In yet another example, industries that rely on transportation often utilize fleet cards, used by drivers for purchasing fuel, vehicle maintenance and repairs, and other associated costs.

In some cases, it may be beneficial for issuers or account holders to obtain extra information, either for enhanced authorization or additional data collection, during a payment transaction, such as having the driver that uses a fleet card supply the mileage of the vehicle, or their authorized driver identifier or personal identification number, when purchasing gas. Currently, this is accomplished by storing data indicators on the magnetic stripe of a payment card that, when read by a point of sale device, trigger the display of pre-programmed prompts. Unfortunately, memory limitations on magnetic stripe payment cards result in a very small capacity of indicators that may be stored therein, limiting the ability for issuers and account holders to customize the prompts. Furthermore, each point of sale device must be pre-programmed with the prompts corresponding to each indicator. As a result, prompts may not be customized or changed without communicating with every point of sale operator and reprogramming each point of sale device, which can be extremely difficult, time consuming, and resource-intensive. Furthermore, because these prompts cannot be dynamically managed, the magnetic stripe environment reduces the market's ability to either enhance authorization and security capabilities, or collect additional safety information from the cardholder (e.g., rest periods, hazardous cargo types, etc.).

Thus, there is a need for a technical solution whereby point of sale devices may display customizable prompts, such as for enhanced authorization or additional data collection, during the transaction process, without requiring pre-programming of prompts in the point of sale device.

SUMMARY

The present disclosure provides a description of systems and methods for providing scripts to point of sale devices for execution as part of an electronic payment transaction for customized data collection. By using an integrated circuit payment card, the memory limitations of magnetic stripe payment cards may be avoided. In addition, the use of executable scripts that are stored on the payment card and conveyed to the point of sale device may enable the customization of prompts by the issuer and/or account holder, and also provide for the display and collection of data related to customized prompts by the point of sale device without requiring specialized pre-programming of the point of sale device, enabling easier adjustment and updating of executable scripts without modification to point of sale devices. The point of sale device may also be able, via the executable scripts, to gather static information from the integrated circuit payment card, or from other associated devices (e.g., a mobile computing device, vehicle computer, etc.) to collect additional information as part of the customized data collection.

A method for providing scripts for execution as part of an electronic transaction includes: storing, in a memory of an integrated circuit payment card, at least one or more executable scripts, payment credentials, and a cryptogram rule; receiving, by a receiving device of the integrated circuit payment card, a transaction request from a point of sale device, wherein the transaction request includes at least one or more transaction items and a script request; generating, by a generation module of the integrated circuit payment card, at least one payment cryptogram based on at least the cryptogram rule and at least one of the one or more transaction items; and electronically transmitting, by a transmitting device of the integrated circuit payment card, at least one of the one or more executable scripts, the payment credentials, and the generated at least one payment cryptogram to the point of sale device.

A method for providing prompted data as part of an electronic transaction includes: electronically transmitting, by a transmitting device of a point of sale device, a transaction request to an integrated circuit payment card, wherein the transaction request includes at least one or more transaction items and a script request; receiving, by a receiving device of the point of sale device, payment credentials, at least one payment cryptogram, and at least one executable script from the integrated circuit payment card; executing, by a processor of the point of sale device, each of the at least one executable scripts, wherein execution of each of the at least one executable scripts includes displaying, by a display device interfaced with the point of sale device, a prompt for data; receiving, by an input device of the point of sale device, a data value for each prompt for data displayed by the display device; and electronically transmitting, by the transmitting device of the point of sale device, at least the payment credentials, transaction data, and the received data values.

A system for providing scripts for execution as part of an electronic transaction includes: a memory of an integrated circuit payment card configured to store at least one or more executable scripts, payment credentials, and a cryptogram rule; a receiving device of the integrated circuit payment card configured to receive a transaction request from a point of sale device, wherein the transaction request includes at least one or more transaction items and a script request; a generation module of the integrated circuit payment card configured to generate at least one payment cryptogram based on at least the cryptogram rule and at least one of the one or more transaction items; and a transmitting device of the integrated circuit payment card configured to electronically transmit at least one of the one or more executable scripts, the payment credentials, and the generated at least one payment cryptogram to the point of sale device.

A system for providing prompted data as part of an electronic transaction includes: a transmitting device of a point of sale device configured to electronically transmit a transaction request to an integrated circuit payment card, wherein the transaction request includes at least one or more transaction items and a script request; a receiving device of the point of sale device configured to receive payment credentials, at least one payment cryptogram, and at least one executable script from the integrated circuit payment card; a processor of the point of sale device configured to execute each of the at least one executable scripts, wherein execution of each of the at least one executable scripts includes displaying, by a display device interfaced with the point of sale device, a prompt for data; and an input device of the point of sale device configured to receive a data value for each prompt for data displayed by the display device, wherein the transmitting device of the point of sale device is further configured to electronically transmit at least the payment credentials, transaction data, and the received data values.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
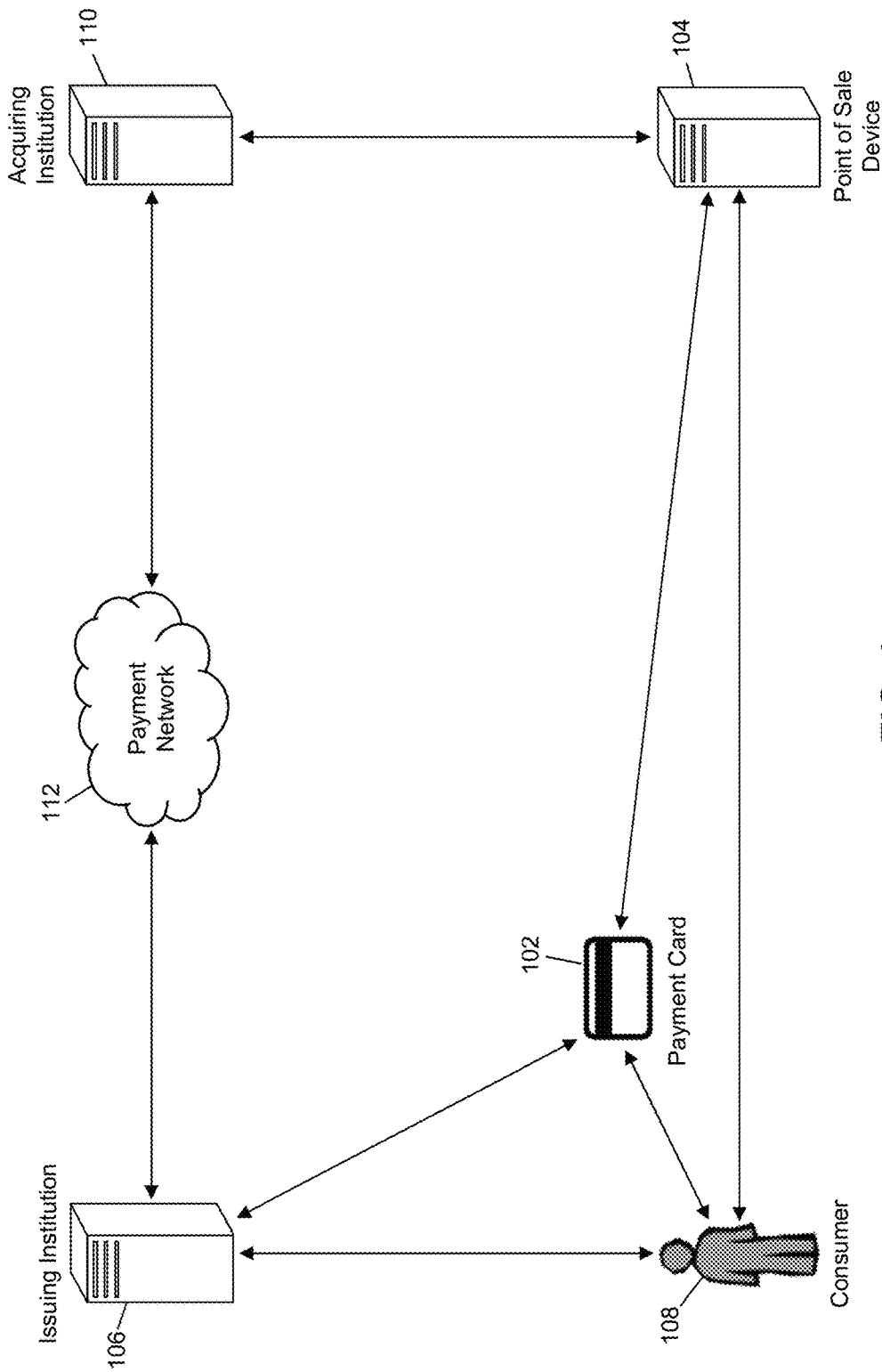
FIG. 1 is a block diagram illustrating a high level system architecture for providing scripts for collection of prompted data in an electronic transaction in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, automated fuel dispenser, etc.) in a physical location that a customer visits as part of the transaction, such as in a "brick and mortar" store or forecourt, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Customized Data Collection at Point of Sale

FIG. 1 illustrates a system 100 for the collection of data based on customized issuer- and account holder-defined prompts resulting from scripts executed at a point of sale device as part of an electronic payment transaction.

The system 100 may include a payment card 102. In an exemplary embodiment, the payment card 102, discussed in more detail below, may be an integrated circuit payment card, which may have an integrated circuit included therein configured to store payment credentials, executable scripts, and other data for use in performing the functions discussed herein. The payment card 102 may be configured to be read by a point of sale device 104. The point of sale device 104, discussed in more detail below, may be configured to read data from the payment card 102 and execute executable scripts stored therein to display a prompt for entry of additional data to be collected as part of an electronic payment transaction.

The payment card 102 may be issued by an issuing institution 106. The issuing institution 106 may be any type of entity configured to perform the functions discussed herein, such as a financial institution, such as an issuing bank. The issuing institution 106 may manage or otherwise be associated with transaction accounts for use in funding payment transactions. The issuing institution 106 may issue the payment card 102 to a consumer 108 for a transaction account where the consumer 108 is an account holder or other authorized user for the transaction account.

The payment card 102 may include an integrated circuit that may have memory included therein, where the memory is configured to store one or more executable scripts. Each executable script may be executable by any suitable point of sale device 102 and may be configured, once executed by the point of sale device 102 during the initiating of a payment transaction, to prompt the consumer 108 for entry of data into the point of sale device 102 using a suitable input method, where the entered data will be provided to the issuing institution 106 as part of the processing of the payment transaction.

For example, the consumer 108 may insert the payment card 102 into the point of sale device 104 or otherwise establish a communication channel between the payment card 102 and point of sale device 104. For instance, the communication channel may be physical, such as by the point of sale device 104 having contact points matching corresponding contact points on the integrated circuit of the payment card 102, or may be wireless, such as communication via near field communication, Bluetooth, radio frequency, or other suitable communication medium. As part of the traditional communication between integrated circuit payment cards 102 and point of sale devices 104, the point of sale device 104 may provide one or more transaction items for use by the payment card 102 in generating one or more payment cryptograms for the payment transaction for use in authorization thereof. Transaction items may include, for instance, transaction time, transaction date, transaction amount, currency type, merchant identification number, geographic location, or any other data related to the payment transaction, point of sale device 104, merchant associated therewith, etc. that may be suitable for use in the generation of a payment cryptogram. The payment card 102 may then use the transaction items to generate one or more payment cryptograms.

In addition to the transaction items, the point of sale device 104 may electronically transmit a script request to the payment card 102 using the established communication channel. The script request may request executable scripts stored in the payment card 102 for execution by the point of sale device 104. In some instances, the point of sale device 104 may transmit the script request to any payment card, where payment cards that are not configured to perform the functions of the payment card 102 as discussed herein may perform no additional actions as a result of the request. In some cases, the point of sale device 104 may first receive an indication from the payment card 102 that scripts are stored therein prior to the transmission of the script request. In some embodiments, the script request may specify specific executable scripts or criteria associated with the identification of executable scripts, such as, as discussed below, formatting limitations.

The payment card 102 may receive the script request and may identify one or more executable scripts for transmission back to the point of sale device 104. Each executable script, when executed by the point of sale device 104, may cause the point of sale device 104 to display a prompt to the consumer 108 and provide for the consumer 108 to enter data into the point of sale device 104 for collection and conveyance as part of the electronic payment transaction. In some cases, an executable script may include a data message, which may be shown in the prompt to instruct the consumer 108 as to what data is being requested. For instance, if the payment card 102 is a fleet card, a first executable script may prompt the consumer 108 to provide their vehicle's identification number and a second executable script may prompt the consumer 108 to provide the current mileage of the vehicle.

In some cases, the consumer 108 or another authorized user associated with a transaction account, in addition to the issuing institution 106, may be enabled to customize the executable scripts and prompts associated therewith. For example, if the transaction account is a business account, management of the business may customize a prompt to request an employee identification number to be entered as part of the data collection for a transaction, such as for record keeping purposes. In another example, a parent may customize a prompt to request a memo for entry as to the reason for a purchase, such as for monitoring the spending habits of their children.

In some embodiments, the response that may be given for a prompt may be specified as part of the executable script. For instance, the executable script may specify a data type and/or data size for a response. The data type may be, for example, the type of data file or type of character set that may be used to respond to the associated prompt. For instance, the response for a given prompt may be restricted to only integers (e.g., as for data mileage), only alphanumeric characters (e.g., for a vehicle identification number), or an image (e.g., of the consumer 108 for verification of the user). The data size may be a limitation on the length of characters that may be entered or another limit on the data value that may be provided as the response. For instance, a prompt for an employee identification number may be limited to a specific number of digits, corresponding to the number of digits expected to be in an employee identification number.

The payment card 102 may identify any executable scripts that may be transmitted to the point of sale device 104 for execution thereby. In cases where the point of sale device 104 may have limited prompting or input options (e.g., the point of sale device 104 may lack a camera for the capturing of images), the payment card 102 may only transmit executable scripts for which the point of sale device 104 is configured for execution and data capture. For example, the script request may indicate the limitations of the point of sale device 104, which may be used by the payment card 102 in identifying the suitable executable scripts.

The payment card 102 may transmit the executable scripts and any other data to be used in the payment transaction to the point of sale device 104 using the established communication channel. The other data may include, for example, payment credentials associated with the transaction account, where payment credentials may include data that will be apparent to persons having skill in the relevant art, such as a transaction account number, name, security code, expiration date, etc., as well as any payment cryptograms generated by the payment card 102 for the payment transaction. In some embodiments, an executable script may also include or otherwise be associated with an identification value. The identification value may be unique to the corresponding executable script, for use in identifying the prompt to which a response value is associated. In such embodiments, the payment card 102 may also electronically transmit the identifier for each identified executable script to the point of sale device 104.

The point of sale device 104 may receive the scripts and other transaction data and may execute each of the received executable scripts, where execution thereby causes a display device interfaced with the point of sale device 104 to display the prompt for the executable script. The consumer 108 may then provide a response to the prompt using any suitable input device or devices of the point of sale device 104, such as a keyboard, mouse, touch screen, click wheel, scroll wheel, camera, microphone, etc. The point of sale device 104 may then include the response value, and any identifier, as applicable, for each executable script in the transaction data that is used in the processing of the electronic payment transaction.

The point of sale device 104 may electronically transmit the response values and other transaction data to an acquiring institution 110, which may be a financial institution, such as an acquiring bank, or other entity configured to issue transaction accounts to merchants and other entities for the receipt of funds as part of electronic payment transactions. In some embodiments, the issuing institution 106 and acquiring institution 110 may be the same entity. The acquiring institution 110 may include the response values in a transaction message submitted to a payment network 112 for use in the processing of the payment transaction.

Transaction messages may be specially formatted data messages that are formatted pursuant to one or more standards governing the exchange of financial transaction messages, such as the International Organization of Standardization's ISO 8583 or 20022 standards. Each transaction message may include a message type indicator configured to indicate a type of the transaction message, such as an authorization request first submitted to the payment network 112 for approval or denial. Each transaction message may also include one or more data elements configured to store data associated with the payment transaction, such as data elements configured to store a transaction amount, transaction time, transaction date, geographic location, currency type, merchant identification number, merchant name, merchant industry, issuer data, acquirer data, transaction type, product data, consumer data, reward data, loyalty data, offer data, etc. In some cases, a transaction message may include one or more bitmaps, which may be configured to store data indicating the data elements included in the transaction message and the data stored therein. Additional information regarding transaction messages and use thereof in the processing of payment transactions is discussed in more detail below with respect to the process 800 illustrated in FIG. 8.

The acquiring institution 110 may generate and submit a transaction message to the payment network 112 for the payment transaction, which may be an authorization request that includes data elements including at least one or more data elements configured to store the response values provided by the consumer 108 via the point of sale device 104. In some cases, each response value may be stored in a separate data element. In other cases, a single data element may be used to store each of the response values. In instances where an executable script may be associated with an identifier, the data element that is used to store the corresponding response value may also include the associated identifier, such as for use by the issuing institution 106 and/or the account holder in identifying the script to which the response value is associated.

The payment network 112 may receive the transaction message from the acquiring institution 110 via payment rails associated therewith. The payment network 112 may perform any functions associated with the processing of the payment transaction, such as fraud scoring, application of transaction controls, remapping of payment credentials, etc., and may forward the authorization request to the issuing institution 106 via the payment rails. The issuing institution 106 may receive the authorization request and may approve or deny the payment transaction using traditional methods and systems. As part of the authorization process, the issuing institution 106 may identify the response values stored in the transaction message, and, if applicable, their associated identifiers. In instances where the account holder may have customized the executable scripts, or where the account holder may otherwise be provided access to the data, the issuing institution 106 may make the response values available to the account holder, such as via a web page, application program, or other accessible platform.

The issuing institution 106 may return an authorization response to the payment network 112 that is a transaction message where the included data elements include at least one data element configured to store a response code that indicates approval or denial of the payment transaction based on the decision of the issuing institution 106. The authorization response may be returned to the payment network 112 via the payment rails, which may perform any associated functions, such as the remapping of the payment credentials, and then forward the authorization response to the acquiring institution 110. The acquiring institution 110 may inform the merchant associated with the point of sale device 104 of the approval or denial, and the merchant may then finalize the payment transaction with the consumer 108. For instance, if the payment card 102 is a fleet card and being used to purchase fuel, the merchant may provide the consumer 108 with access to a fuel pump for the purchased amount of fuel.

As discussed above, the issuing institution 106 may collect the response values provided by consumers 108 during the initiation of payment transactions based on their inclusion in transaction messages submitted for the payment transactions. The response values may be provided for customized prompts that are displayed via the execution of executable scripts stored in the payment card 102 that are customized by the issuing institution 106 (e.g., at the request of an account holder, if applicable) for the collection of desired data. The issuing institution 106 may use the response values for any suitable function, such as for analysis for providing of additional services to customers, for providing to customers of the issuing institution 106, etc. For example, if the payment card 102 is a fleet card and the account holder is an employer, the response values may include request mileages, driver identification numbers, vehicle identification numbers, etc., which may be forwarded on to the employer by the issuing institution 106.

In some embodiments, the point of sale device 104 may be configured to gather static data values for inclusion in the data provided to the issuing institution 106 as part of the payment transaction. In some cases, the static data values may be stored in the payment card 102 and received by the point of sale device 104 along with, or based on execution of, the executable scripts. Such static data values may include, for instance, an identification number, employee name, vehicle identification number (e.g., of the vehicle to which the payment card 102 was assigned), etc. In some instances, the point of sale device 104 may receive static data values from other devices. For example, the payment card 102 or point of sale device 104 may interface with another device for collection of static data therefrom, such as a vehicle computer, mobile computing device, etc. For instance, the payment card 102 may be a mobile computing device having an electronic wallet application program stored therein, and may be configured to store static data associated with the vehicle, and may be configured to convey such data to the point of sale device 104 with the executable script(s). In another example, a telematics device installed on a vehicle may be removed and interfaced with the point of sale device 104, along with the payment card 102, for the collection of data stored thereon, which may be provided to the issuing institution 106 along with data collected via the prompts made to the consumer 108. Such data may be collected by the issuing institution 106 for the collection of static data in addition to data supplied by the consumer 108 via the prompts.

The methods and systems discussed herein may enable issuing institutions 106 and account holders to collect customized data during payment transactions without requiring the specialized programming and reprogramming of a point of sale device 104. The payment card 102 may store executable scripts that may be read by the point of sale device 104 and executed to display customized prompts for data, where the consumer 108 in the transactions provides response values that are forwarded on as part of the payment transaction. As a result, the scripts and data collected thereby may be changed without requiring modification to the point of sale device 104, enabling the data collection to be changed and modified to fit the needs of issuing institutions 106 and account holders without affecting merchants and point of sale devices 104.

Payment Card

Figure 2:
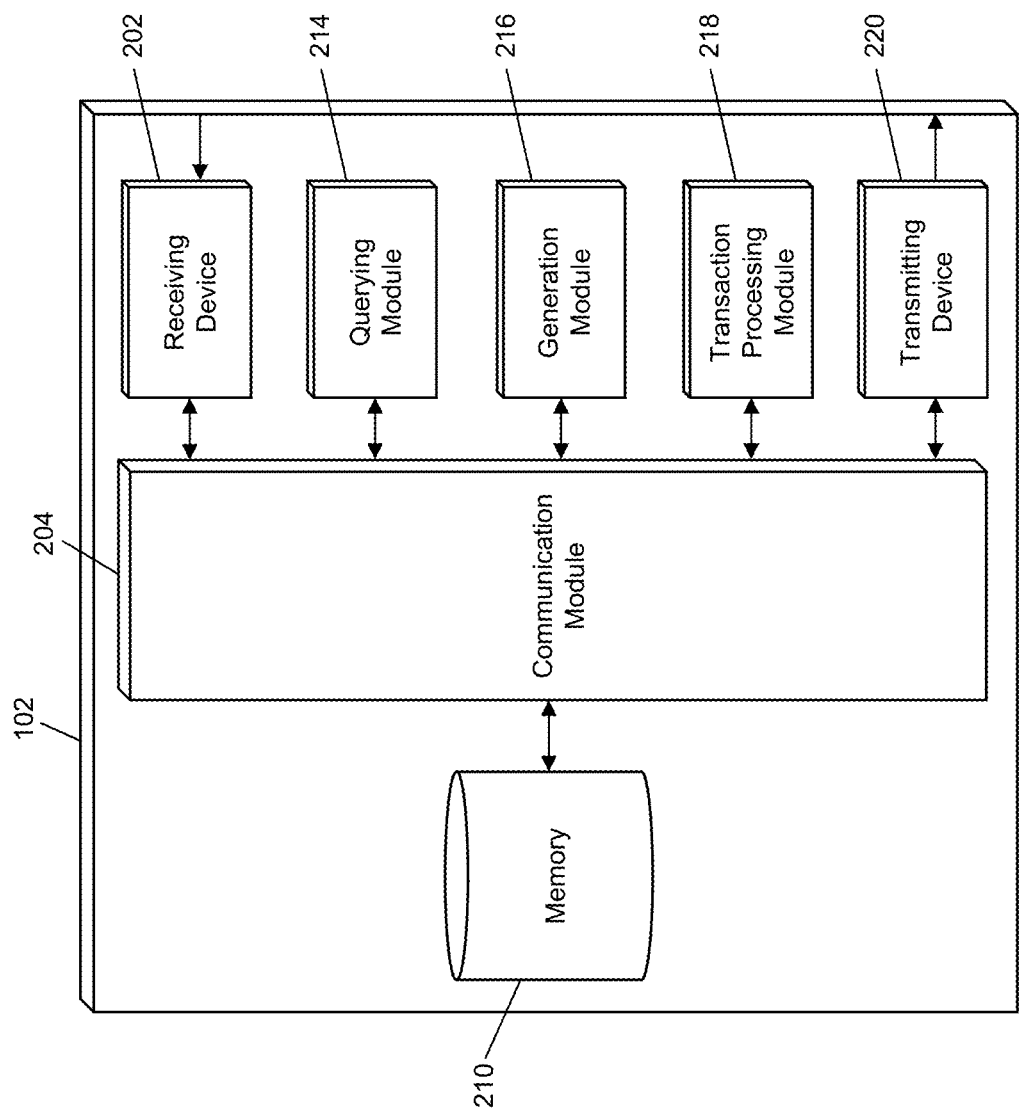
FIG. 2 is a block diagram illustrating the payment card of the system of FIG. 1 for providing scripts for execution as part of an electronic transaction in accordance with exemplary embodiments.

FIG. 2 illustrates an embodiment of a payment card 102 in the system 100. It will be apparent to persons having skill in the relevant art that the embodiment of the payment card 102 illustrated in FIG. 2 is provided as illustration only and may not be exhaustive to all possible configurations of the payment card 102 suitable for performing the functions as discussed herein. For example, the computer system 900 illustrated in FIG. 9 and discussed in more detail below may be a suitable configuration of the payment card 102. In an exemplary embodiment, the components of the payment card 102 as illustrated in FIG. 2 and discussed herein may be included in an integrated circuit.

The payment card 102 may include a receiving device 202. The receiving device 202 may be configured to receive data over one or more networks via one or more network protocols. In some instances, the receiving device 202 may be configured to receive data from issuing institutions 106, point of sale devices 104, and other systems and entities via one or more communication methods, such as near field communication, physical contact points, Bluetooth, etc. In some embodiments, the receiving device 202 may be comprised of multiple devices, such as different receiving devices for receiving data over different networks, such as a first receiving device for receiving data over near field communication and a second receiving device for receiving data via physical contact points. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by point of sale devices 104, which may be superimposed or otherwise encoded with transaction terms, which may include data associated with a payment transaction, such as a transaction amount, point of sale identifier, merchant identifier, etc., and may also include a script request, which, in some cases, may indicate one or more executable scripts that are requested and/or limitations of the point of sale device 104. The receiving device 202 may also be configured to receive data signals electronically transmitted by issuing institutions 106, which may be superimposed with payment credentials and executable scripts for storage in the payment card 102 for use in performing the functions discussed herein.

The payment card 102 may also include a communication module 204. The communication module 204 may be configured to transmit data between modules, engines, databases, memories, and other components of the payment card 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the payment card 102 and external components of the payment card 102, such as externally connected databases, display devices, input devices, etc. The payment card 102 may also include a processing device. The processing device may be configured to perform the functions of the payment card 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, transaction processing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The payment card 102 may also include a memory 210. The memory 210 may be configured to store data for use by the payment card 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the payment card 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store payment credentials and cryptogram rules for use in the authorization and funding of payment transactions. Payment credentials may include transaction account numbers, names, expiration dates, security codes, transaction counters, etc. Cryptogram rules may be rules used for the generation of payment cryptograms to be used in authorization of a payment transaction. The memory 210 may also be configured to store one or more executable scripts, which may be executed by point of sale devices 104 for data collection. In some instances, each executable script may be associated with an identifier, which may be stored in the memory 210 and/or included in the respective executable script. In some cases, the memory 210 may also include data types and/or data sizes for one or more executable scripts, which may be limitations on the response values that may be given for the data prompt displayed via the respective executable script.

The payment card 102 may include a querying module 214. The querying module 214 may be configured to execute queries on databases to identify information. The querying module 214 may receive one or more data values or query strings, and may execute a query string based thereon on an indicated database, such as the memory, to identify information stored therein. The querying module 214 may then output the identified information to an appropriate engine or module of the payment card 102 as necessary. The querying module 214 may, for example, execute a query on the memory to identify one or more executable scripts for execution by the point of sale device 104, where the querying module 214 may query only for those executable scripts that satisfy limitations of the point of sale device 104, such as based on the input devices of the point of sale device 104.

The payment card 102 may also include a generation module 216. The generation module 216 may be configured to generate data for use in performing the functions of the payment card 102 as discussed herein. The generation module 216 may receive instructions as input, which may be used to generate data, and the generated data output to one or more engines or modules of the payment card 102. In some instances, the instructions input to the generation module 216 may be accompanied by data for use therewith. For example, the generation module 216 may be configured to generate one or more payment cryptograms for a payment transaction, which may be based on cryptogram rules stored in the memory 210 and transaction terms received from the point of sale device 104 (e.g., via the receiving device 202) for the payment transaction. The generation module 216 may also be configured to generate any other additional data used in the processing and/or authorization of a payment transaction to be funded by the transaction account associated with the payment card 102.

The payment card 102 may also include a transaction processing module 218. The transaction processing module 218 may be configured to perform additional functions of the payment card 102 related to the processing of payment transactions. For instance, the transaction processing module 218 may be configured to modify transaction counters based on usage of the payment card 102, to adjust statistics related to payment transactions stored in the memory 210, to manage the storage and use of payment credentials in the memory 210, to perform checks on personal identification numbers used with the payment card 102, etc. Additional functions that may be performed by the transaction processing module 218 will be apparent to persons having skill in the relevant art.

The payment card 102 may also include a transmitting device 220. The transmitting device 220 may be configured to transmit data over one or more networks via one or more network protocols. In some instances, the transmitting device 220 may be configured to transmit data to issuing institutions 106, point of sale devices 104, and other entities via one or more communication methods, such as near field communication, physical contact points, Bluetooth, radio frequency, etc. In some embodiments, the transmitting device 220 may be comprised of multiple devices, such as different transmitting devices for transmitting data over different networks, such as a first transmitting device for transmitting data over near field communication and a second transmitting device for transmitting data via physical contact points. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to point of sale devices 104 that are superimposed or otherwise encoded with executable scripts, identifiers or other data associated therewith (e.g., data types, data sizes, etc.), payment credentials, payment cryptograms, and other data that may be used in the processing of a payment transaction to be funded by the transaction account associated with the payment card 102.

Point of Sale Device

Figure 3:
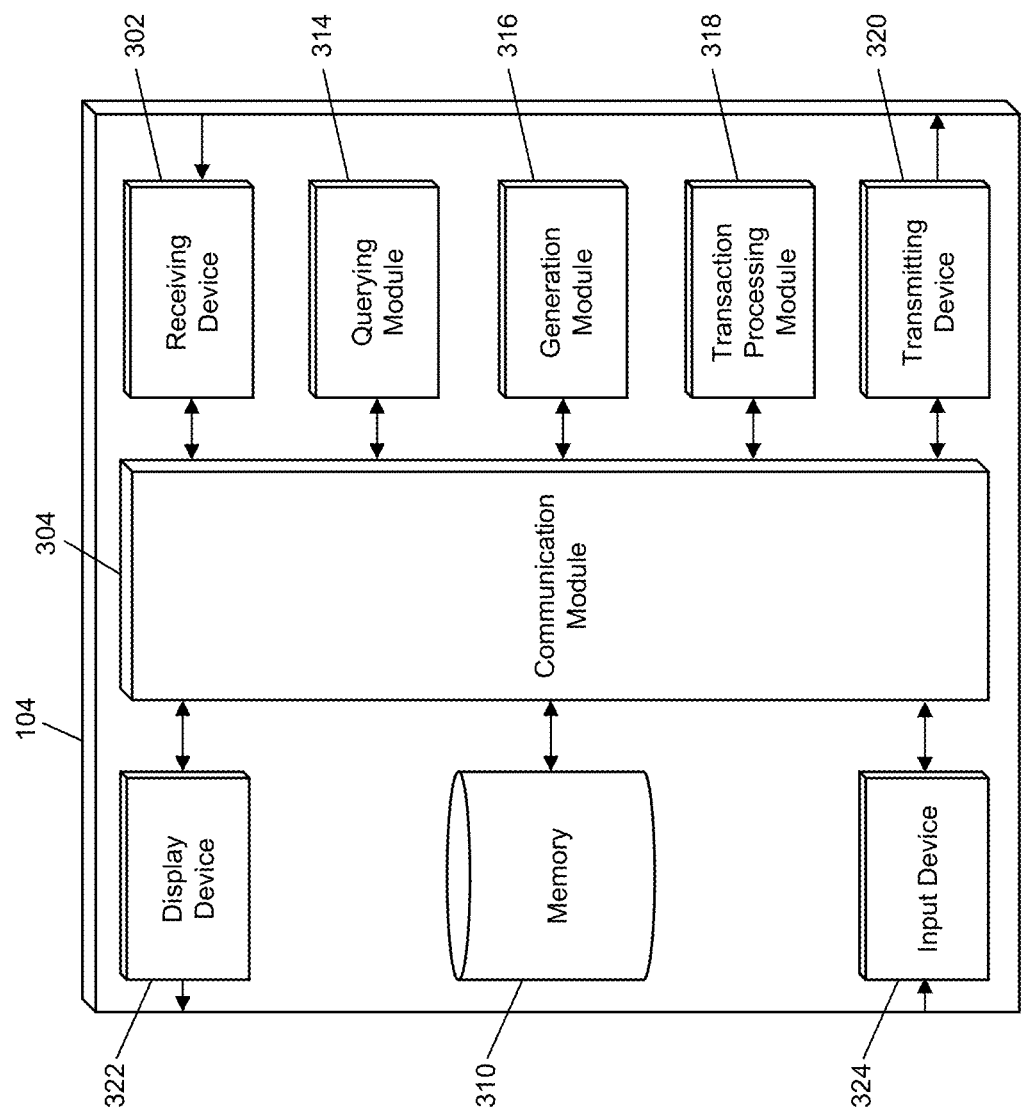
FIG. 3 is a block diagram illustrating the point of sale device of the system of FIG. 1 for collecting prompted data as part of an electronic transaction in accordance with exemplary embodiments.

FIG. 2 illustrates an embodiment of a point of sale device 104 in the system 100. It will be apparent to persons having skill in the relevant art that the embodiment of the point of sale device 104 illustrated in FIG. 3 is provided as illustration only and may not be exhaustive to all possible configurations of the point of sale device 104 suitable for performing the functions as discussed herein. For example, the computer system 900 illustrated in FIG. 9 and discussed in more detail below may be a suitable configuration of the point of sale device 104.

The point of sale device 104 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks 112 for the transmission of transaction messages that include sensitive financial data and information. In some instances, the receiving device 302 may also be configured to receive data from payment cards 102, acquiring institutions 110, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by payment cards 102, which may be superimposed or otherwise encoded with executable scripts, identifiers or other data associated therewith (e.g., data types, data sizes, etc.), payment credentials, payment cryptograms, and other data that may be used in the processing of a payment transaction to be funded by the transaction account associated with the payment card 102. The receiving device 302 may also be configured to receive data signals electronically transmitted by acquiring institutions 110, such as may be superimposed or otherwise encoded with data indicating the approval or denial of a payment transaction for which authorization was sought, such as for use in finalizing a payment transaction. In some cases, the receiving device 302 may be configured to receive data signals electronically transmitted by additional devices, such as a telematics device of a vehicle, that are superimposed or otherwise encoded with static data.

The point of sale device 104 may also include a communication module 304. The communication module 304 may be configured to transmit data between modules, engines, databases, memories, and other components of the point of sale device 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 204 may also be configured to communicate between internal components of the point of sale device 104 and external components of the point of sale device 104, such as externally connected databases, display devices, input devices, etc. The point of sale device 104 may also include a processing device. The processing device may be configured to perform the functions of the point of sale device 104 discussed herein as will be apparent to persons having skill in the relevant art. In some embodiments, the processing device may include and/or be comprised of a plurality of engines and/or modules specially configured to perform one or more functions of the processing device, such as a querying module 314, generation module 316, transaction processing module 318, etc. As used herein, the term "module" may be software or hardware particularly programmed to receive an input, perform one or more processes using the input, and provides an output. The input, output, and processes performed by various modules will be apparent to one skilled in the art based upon the present disclosure.

The point of sale device 104 may also include a memory 310. The memory 310 may be configured to store data for use by the point of sale device 104 in performing the functions discussed herein, such as public and private keys, symmetric keys, etc. The memory 310 may be configured to store data using suitable data formatting methods and schema and may be any suitable type of memory, such as read-only memory, random access memory, etc. The memory 310 may include, for example, encryption keys and algorithms, communication protocols and standards, data formatting standards and protocols, program code for modules and application programs of the processing device, and other data that may be suitable for use by the point of sale device 104 in the performance of the functions disclosed herein as will be apparent to persons having skill in the relevant art, such as transaction data for a payment transaction to be processed, including one or more transaction terms for providing to payment cards 102. In some embodiments, the memory 310 may be comprised of or may otherwise include a relational database that utilizes structured query language for the storage, identification, modifying, updating, accessing, etc. of structured data sets stored therein.

The point of sale device 104 may include a querying module 314. The querying module 314 may be configured to execute queries on databases to identify information. The querying module 314 may receive one or more data values or query strings, and may execute a query string based thereon on an indicated database, such as the memory 310, to identify information stored therein. The querying module 314 may then output the identified information to an appropriate engine or module of the point of sale device 104 as necessary. The querying module 314 may, for example, execute a query on the memory 310 to identify one or more transaction terms stored therein for a payment transaction, for providing to a payment card 102 for use in generating payment cryptograms for use in the processing of the payment transaction.

The point of sale device 104 may also include a generation module 316. The generation module 316 may be configured to generate data for use in performing the functions of the point of sale device 104 as discussed herein. The generation module 316 may receive instructions as input, which may be used to generate data, and the generated data output to one or more engines or modules of the point of sale device 104. In some instances, the instructions input to the generation module 316 may be accompanied by data for use therewith. For example, the generation module 316 may be configured to generate a transaction message for the payment transaction for forwarding to the acquiring institution 110 for submission to the payment network 112, or to generate data for inclusion therein, such as additional cryptograms or other similar data. The generation module 316 may also be configured to generate data for use in payment transactions, such as a transaction identifier to be used for identification of messages and other transmissions related to a specific payment transaction.

The point of sale device 104 may also include a transaction processing module 318. The transaction processing module 318 may be configured to perform additional functions of the point of sale device 104 related to the processing of payment transactions. For instance, the transaction processing module 318 may be configured to modify transaction counters based on usage of the point of sale device 104, to adjust statistics related to payment transactions stored in the memory 310, to calculate transaction amounts based on products being purchased, applicable taxes, and other associated fees, to manage the storage and usage of product data, etc. Additional functions that may be performed by the transaction processing module 318 will be apparent to persons having skill in the relevant art.

The point of sale device 104 may also include a transmitting device 320. The transmitting device 320 may be configured to transmit data over one or more networks via one or more network protocols. In some embodiments, the transmitting device 320 may be configured to transmit data over the payment rails, such as using specially configured infrastructure associated with payment networks 112 for the transmission of transaction messages that include sensitive financial data and information, such as identified payment credentials. In some instances, the transmitting device 320 may be configured to transmit data to payment cards 102, acquiring institutions 110, and other entities via alternative networks, such as the Internet. In some embodiments, the transmitting device 320 may be comprised of multiple devices, such as different transmitting devices for transmitting data over different networks, such as a first transmitting device for transmitting data over the payment rails and a second transmitting device for transmitting data over the Internet. The transmitting device 320 may electronically transmit data signals that have data superimposed that may be parsed by a receiving computing device. In some instances, the transmitting device 320 may include one or more modules for superimposing, encoding, or otherwise formatting data into data signals suitable for transmission.

The transmitting device 320 may be configured to electronically transmit data signals to payment cards 102, which may be superimposed or otherwise encoded with transaction terms for a payment transaction and a script request. The script request may indicate that executable scripts may be received by the point of sale device 104 and executed thereby (e.g., by a processor of the point of sale device 104), and, in some instances, may include data for use in the identification of the executable scripts, such as identifiers or limitations on data types and/or data sizes for desired response values. The transmitting device 320 may also be configured to electronically transmit data signals to acquiring institutions 110 using a suitable communication network and method, which may be superimposed or otherwise encoded with transaction data for a payment transaction for processing thereof, including payment credentials, payment cryptograms, and response values, which may be accompanied by identifiers, if applicable.

The point of sale device 104 may also include or be otherwise interfaced with one or more input devices 324. The input devices 324 may be internal to the point of sale device 104 or external to the point of sale device 324 and connected thereto via one or more connections (e.g., wired or wireless) for the transmission of data to and/or from. The input devices 324 may be configured to receive input from a user of the point of sale device 104, such as the consumer 108, which may be provided to another module or engine of the point of sale device 104 (e.g., via the communication module 304) for processing accordingly. Input devices 324 may include any type of input device suitable for receiving input for the performing of the functions discussed herein, such as a keyboard, mouse, click wheel, scroll wheel, microphone, touch screen, track pad, camera, optical imager, etc. The input device 324 may be configured to, for example, receive input from the consumer 108 to a prompt displayed as a result of the execution of an executable script. In some cases, the input device 324 may limit the input by the consumer 108 based on one or more requirements included in or otherwise associated with an executable script, such as on the type and/or size of the data. The input device 324 may also be configured to receive static data input from one or more external devices, such as a telematics device.

The point of sale device 104 may also include or be otherwise interfaced with a display device 322. The display device 322 may be internal to the point of sale device 104 or external to the point of sale device 104 and connected thereto via one or more connections (e.g., wired or wireless) for the transmission of data to and/or from. The display device 322 may be configured to display data to a user of the point of sale device 104, such as the consumer 108. The display device 322 may be any type of display suitable for displaying data as part of the functions discussed herein, such as a liquid crystal display, light emitting diode display, thin film transistor display, capacitive touch display, cathode ray tube display, light projection display, etc. In some instances, the point of sale device 104 may include multiple display devices 322. The display device 322 may be configured to, for example, display a prompt to the consumer 108 to prompt for the collection of data following the execution of an executable script received from the payment card 102.

Process for Customized Data Collection at Point of Sale

Figure 4:
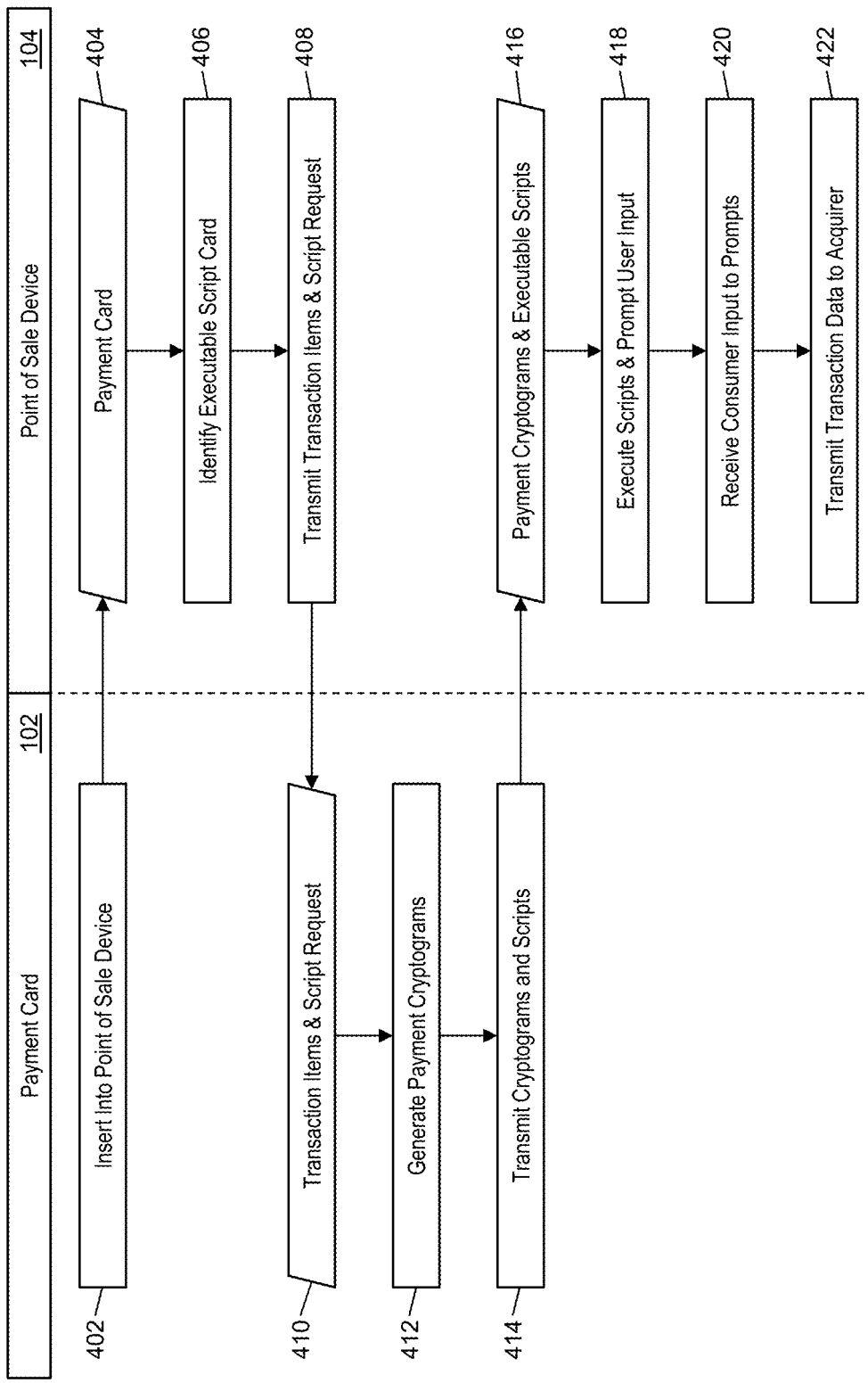
FIG. 4 is a flow diagram illustrating a process for collecting custom prompted data as part of an electronic transaction using the system of FIG. 1 in accordance with exemplary embodiments.

FIG. 4 illustrates a process for the customized collection of data at the point of sale device 104 based on prompts displayed via the execution of executable scripts provided by the payment card 102.

In step 402, the payment card 102 may be inserted into, or otherwise read by, the point of sale device 104. For instance, the payment card 102 may be placed in proximity of the point of sale device 104 for reading thereby via near field communication. In step 404, the point of sale device 104 may receive data from the payment card 102, which may include, for instance, an indication that the payment card 102 includes executable scripts for the collection of customized data. In step 406, the point of sale device 104 may identify that the payment card 102 is an executable script card, such as based on the indication provided by the payment card 102.

In step 408, the transmitting device 320 of the point of sale device 104 may electronically transmit a data signal to the payment card 102 that is superimposed or otherwise encoded with at least one or more transaction items for the payment transaction and a script request. In some instances, the script request may include one or more limitations, such as on the available types of input, such as due to the input devices 324 of the point of sale device 104. In some cases, the script request may specifically identify one or more executable scripts, such as by inclusion of an identifier associated therewith. In step 410, the receiving device 202 of the payment card 102 may receive the data signal and parse the data encoded therein.

In step 412, the generation module 216 of the payment card 102 may generate one or more payment cryptograms for the payment transaction based on at least the cryptogram rules stored in the memory 210 of the payment card 102 and transaction terms received from the point of sale device 104. In step 414, the transmitting device 220 of the payment card 102 may electronically transmit at least the generated payment cryptograms and one or more executable scripts to the point of sale device 104. In some instances, the querying module 214 of the payment card 102 may identify specific executable scripts stored in the memory 210 of the payment card 102 for execution by the point of sale device 104, such as based on the data included in the script request. In some embodiments, the payment card 102 may also electronically transmit static data read from the payment card 102 or another device (e.g., a vehicle telematics device) for transmission to the point of sale device 104. In step 416, the receiving device 302 of the point of sale device 104 may receive the payment cryptograms and executable scripts (e.g., and any additional, static data) from the payment card 102.

In step 418, the point of sale device 104 may execute the executable scripts provided by the payment card 102, which may cause the display device 322 of the point of sale device 104 to display prompts for input of responses by the consumer 108 using one or more input devices 324 of the point of sale device 104. In step 420, the input devices 324 of the point of sale device 104 may receive input from the consumer 108 of a response value for each of the executed executable scripts. In step 422, the transmitting device 320 of the point of sale device 104 may electronically transmit transaction data to the acquiring institution 110 for processing, where the transaction data includes at least the response values, payment cryptograms, and any additional data, such as payment credentials, response value identifiers, etc.

Process for Collection of Customized Data

Figure 5:
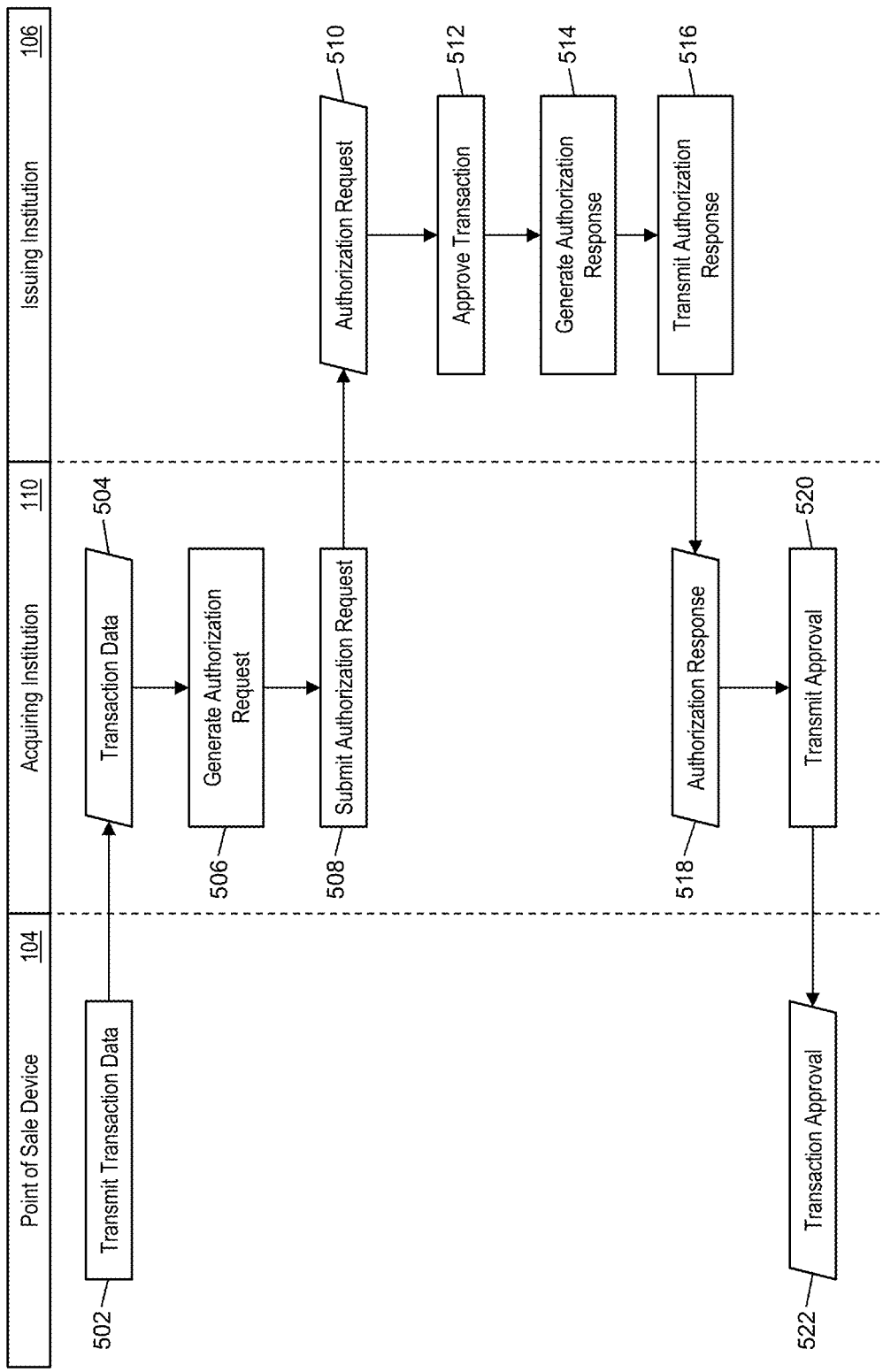
FIG. 5 is a flow diagram illustrating a process for the processing of a payment transaction that includes the delivery of data collected using the system of FIG. 1 in accordance with exemplary embodiments.

FIG. 5 illustrates a process for the collection of customized data as part of a payment transaction based on prompts displayed from executable scripts from a payment card 102.

In step 502, the point of sale device 104 may electronically transmit transaction data to an associated acquiring institution 110 for the processing of a payment transaction. In step 504, the acquiring institution 110 may receive the transaction data, which may include data associated with the payment transaction including at least payment credentials, one or more payment cryptograms, and one or more response values. Each response value may be associated with an executable script and, in some instances, may be of a data type and data size associated therewith and/or may be accompanied by an identifier associated with the related executable script.

In step 506, the acquiring institution 110 may generate an authorization request for the payment transaction. The authorization request may be a specially formatted data message formatted pursuant to one or one or more standards, such as the ISO 8583 or 20022 standards, and include a message type indicator indicative of an authorization request and a plurality of data elements configured to store the transaction data, including the payment cryptograms, payment credentials, and response values. In step 508, the acquiring institution 110 may submit the authorization request to the payment network 112 via payment rails associated therewith. In step 510, the issuing institution 106 may receive the authorization request, which may be forwarded to the issuing institution 106 from the payment network 112 via the payment rails associated therewith.

In step 512, the issuing institution 106 may approve the payment transaction based on the transaction data stored in the authorization request using traditional methods and systems. As part of the receipt of the authorization request, the issuing institution 106 may receive the response values stored in the corresponding data element(s), which may satisfy the collection of data by the issuing institution 106 based on the executable scripts that had been provisioned to the payment card 102. In step 514, the issuing institution 106 may generate an authorization response for the payment transaction using traditional methods, where the authorization response is a transaction message formatted based on the standards used to format the authorization request and includes the plurality of data elements including at least one data element configured to store a response code indicating that the payment transaction is approved.

In step 516, the issuing institution 106 may electronically transmit the authorization response to the payment network 112, which may forward the authorization response to the acquiring institution 110 for receipt in step 518. In step 520, the acquiring institution 110 may electronically transmit an indication that the transaction was approved to the point of sale device 104, which may be received by the receiving device 302 of the point of sale device 104, in step 522.

Exemplary Method for Providing Scripts for Execution

Figure 6:
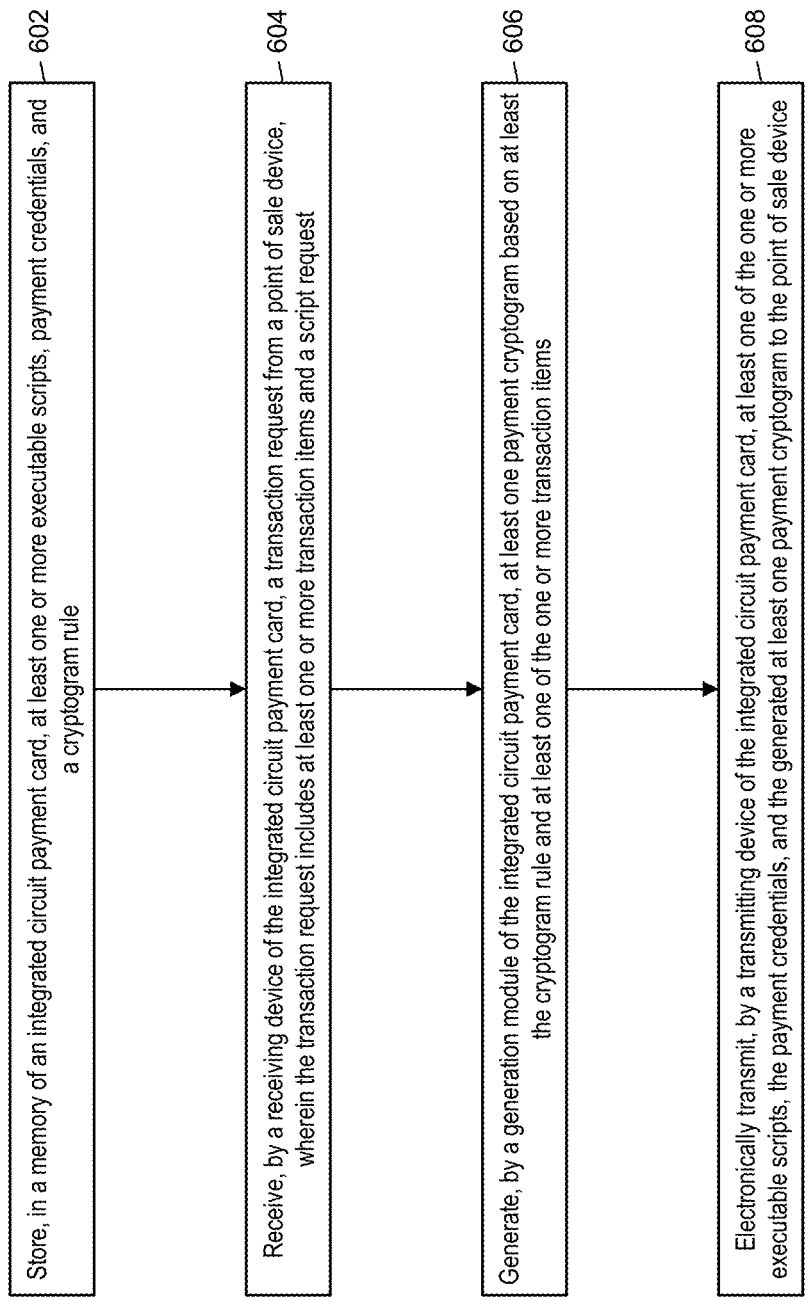
FIG. 6 is a flow chart illustrating an exemplary method for providing scripts for execution as part of an electronic transaction in accordance with exemplary embodiments.

FIG. 6 illustrates a method 600 for the providing of executable scripts from a payment card for execution as part of the initialization of an electronic payment transaction for processing.

In step 602, at least one or more executable scripts, payment credentials, and a cryptogram rule may be stored in a memory (e.g., the memory 210) of an integrated circuit payment card (e.g., the payment card 102). In step 604, a transaction request may be received from a point of sale device (e.g., the point of sale device 104) by a receiving device (e.g., the receiving device 202) of the integrated circuit payment card, wherein the transaction request includes at least one or more transaction items and a script request.

In step 606, at least one payment cryptogram may be generated by a generation module (e.g., the generation module 216) of the integrated circuit payment card based on at least the cryptogram rule and at least one of the one or more transaction items. In step 608, at least one of the one or more executable scripts, the payment credentials, and the generated at least one payment cryptogram may be electronically transmitted to the point of sale device by a transmitting device (e.g., the transmitting device 220) of the integrated circuit payment card.

In one embodiment, the script request may be a flag indicating that the at least one of the one or more executable scripts is requested. In some embodiments, the one or more executable scripts may include at least a data message, an identifier, and one or more response formatting rules. In a further embodiment, the one or more response formatting rules may include at least a data type and a data size. In one embodiment, the integrated circuit payment card may be a fleet card.

Exemplary Method for Providing Prompted Data

Figure 7:
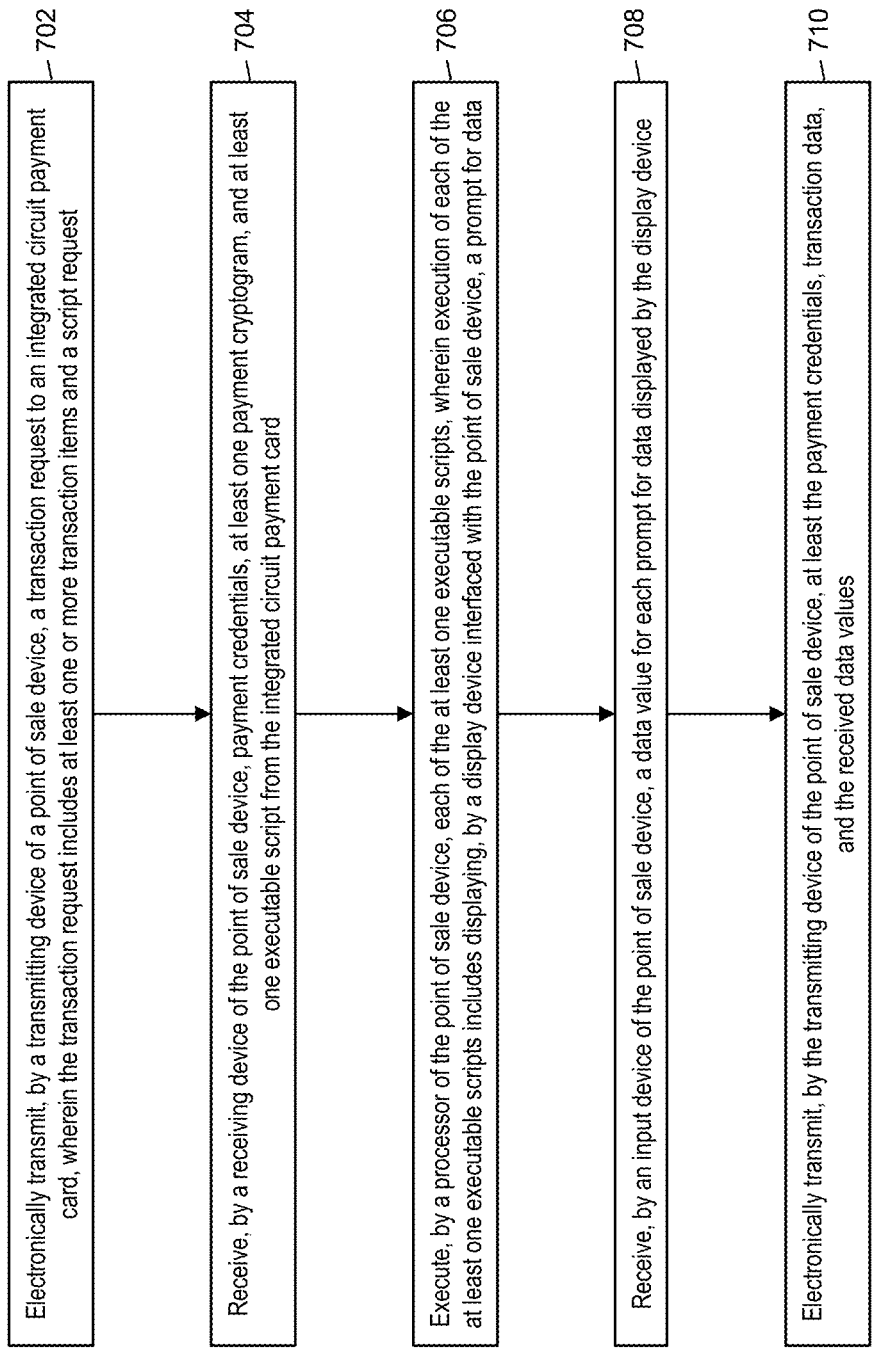
FIG. 7 is a flow chart illustrating an exemplary method for providing prompted data as part of an electronic transaction in accordance with exemplary embodiments.

FIG. 7 illustrates a method 700 for the providing of prompted data for collection using executable scripts as part of an electronic payment transaction.

In step 702, a transaction request may be electronically transmitted by a transmitting device (e.g., the transmitting device 320) of a point of sale device (e.g., the point of sale device 104) to an integrated circuit payment card (e.g., the payment card 102), wherein the transaction request includes at least one or more transaction items and a script request. In step 704, payment credentials, at least one payment cryptogram, and at least one executable script may be received from the integrated circuit payment card by a receiving device (e.g., the receiving device 302) of the point of sale device.

In step 706, each of the at least one executable scripts may be executed by a processor of the point of sale device, wherein execution of each of the at least one executable scripts includes displaying, by a display device (e.g., the display device 322) interfaced with the point of sale device, a prompt for data. In step 708, a data value may be received by an input device (e.g., the input device 324) of the point of sale device for each prompt for data displayed by the display device. In step 710, at least the payment credentials, transaction data, and the received data values may be electronically transmitted by the transmitting device of the point of sale device.

In one embodiment, each of the at least one executable scripts may be associated with an identifier, and the identifier associated with each of the at least one executable scripts may be electronically transmitted with the received data values. In some embodiments, the method 700 may also include storing, in a memory (e.g., the memory 310) of the point of sale device, at least the one or more transaction items and the transaction data.

In one embodiment, each of the at least one executable scripts may include at least a data type and a data size, and the data value received for each of the at least one executable scripts may be of the data type and within the data size included in the respective executable script. In some embodiments, the method 700 may further include generating, by a generation module (e.g., the generation module 316) of the point of sale device, a transaction message, wherein the transaction message is formatted based on one or more standards and includes at least a message type indicator and one or more data elements including at least one or more data elements configured to store the payment credentials, one or more data elements configured to store the transaction data, and one or more data elements configured to store the received data values, wherein transmitting the payment credentials, transaction data, and the received data values includes electronically transmitting the generated transaction message.

Payment Transaction Processing System and Process

Figure 8:
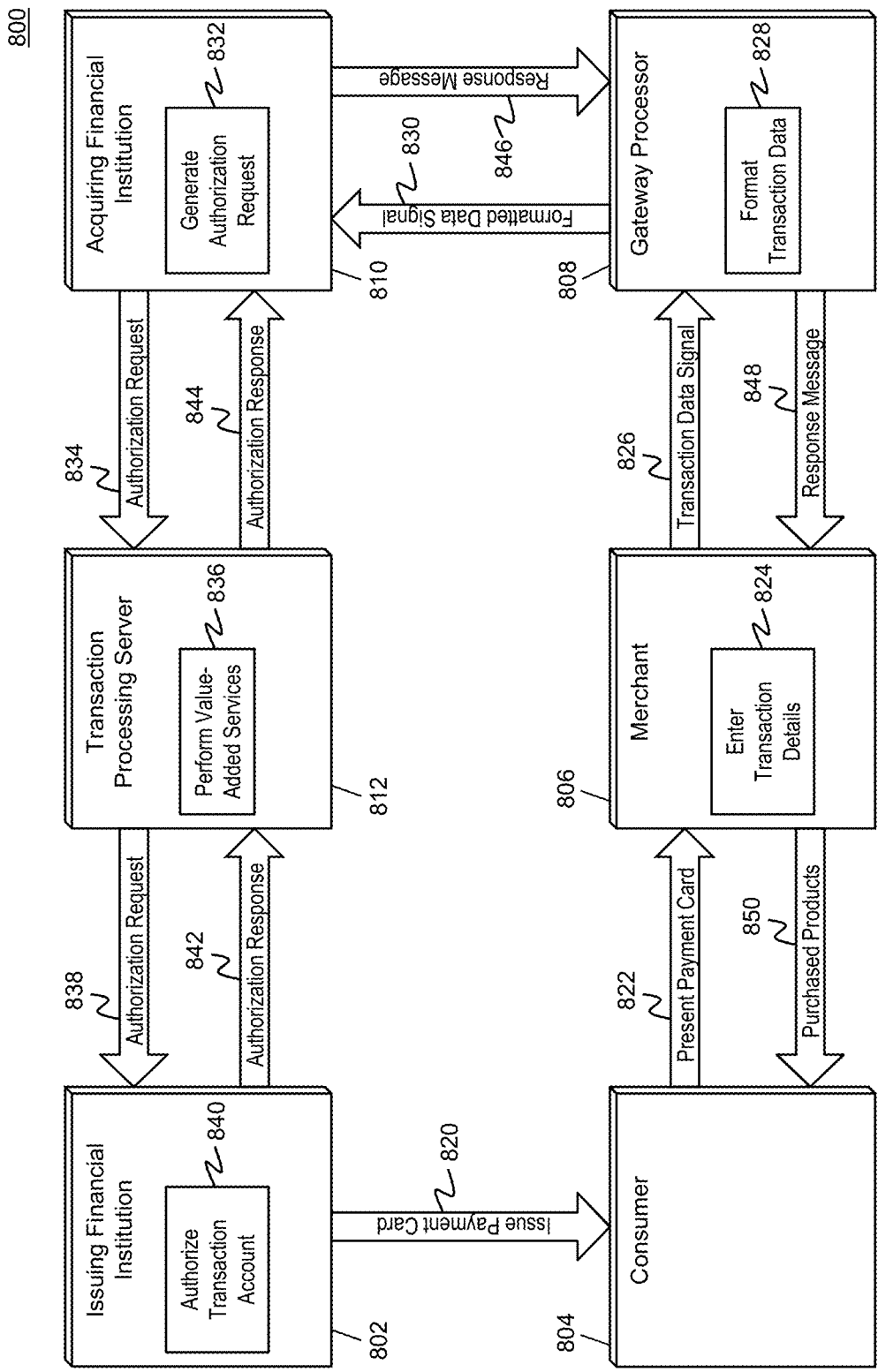
FIG. 8 is a flow diagram illustrating the processing of a payment transaction in accordance with exemplary embodiments.

FIG. 8 illustrates a transaction processing system and a process 800 for the processing of payment transactions in the system, which may include the processing of thousands, millions, or even billions of transactions during a given period (e.g., hourly, daily, weekly, etc.). The process 800 and steps included therein may be performed by one or more components of the system 100 discussed above, such as the payment card 102, point of sale device 104, issuing institution 106, consumer 108, acquiring institution 110, payment network 112, etc. The processing of payment transactions using the system and process 800 illustrated in FIG. 8 and discussed below may utilize the payment rails, which may be comprised of the computing devices and infrastructure utilized to perform the steps of the process 800 as specially configured and programmed by the entities discussed below, including the transaction processing server 812, which may be associated with one or more payment networks configured to processing payment transactions. It will be apparent to persons having skill in the relevant art that the process 800 may be incorporated into the processes illustrated in FIGS. 3-7, discussed above, with respect to the step or steps involved in the processing of a payment transaction. In addition, the entities discussed herein for performing the process 800 may include one or more computing devices or systems configured to perform the functions discussed below. For instance, the merchant 806 may be comprised of one or more point of sale devices, a local communication network, a computing server, and other devices configured to perform the functions discussed below.

In step 820, an issuing financial institution 802 may issue a payment card or other suitable payment instrument to a consumer 804. The issuing financial institution may be a financial institution, such as a bank, or other suitable type of entity that administers and manages payment accounts and/or payment instruments for use with payment accounts that can be used to fund payment transactions. The consumer 804 may have a transaction account with the issuing financial institution 802 for which the issued payment card is associated, such that, when used in a payment transaction, the payment transaction is funded by the associated transaction account. In some embodiments, the payment card may be issued to the consumer 804 physically. In other embodiments, the payment card may be a virtual payment card or otherwise provisioned to the consumer 804 in an electronic format.

In step 822, the consumer 804 may present the issued payment card to a merchant 806 for use in funding a payment transaction. The merchant 806 may be a business, another consumer, or any entity that may engage in a payment transaction with the consumer 804. The payment card may be presented by the consumer 804 via providing the physical card to the merchant 806, electronically transmitting (e.g., via near field communication, wireless transmission, or other suitable electronic transmission type and protocol) payment details for the payment card, or initiating transmission of payment details to the merchant 806 via a third party. The merchant 806 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 824, the merchant 806 may enter transaction details into a point of sale computing system. The transaction details may include the payment details provided by the consumer 804 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 806 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 806 may be an online retailer in an e-commerce transaction. In such embodiments, the transaction details may be entered in a shopping cart or other repository for storing transaction data in an electronic transaction as will be apparent to persons having skill in the relevant art.

In step 826, the merchant 806 may electronically transmit a data signal superimposed with transaction data to a gateway processor 808. The gateway processor 808 may be an entity configured to receive transaction details from a merchant 806 for formatting and transmission to an acquiring financial institution 810. In some instances, a gateway processor 808 may be associated with a plurality of merchants 806 and a plurality of acquiring financial institutions 810. In such instances, the gateway processor 808 may receive transaction details for a plurality of different transactions involving various merchants, which may be forwarded on to appropriate acquiring financial institutions 810. By having relationships with multiple acquiring financial institutions 810 and having the requisite infrastructure to communicate with financial institutions using the payment rails, such as using application programming interfaces associated with the gateway processor 808 or financial institutions used for the submission, receipt, and retrieval of data, a gateway processor 808 may act as an intermediary for a merchant 806 to be able to conduct payment transactions via a single communication channel and format with the gateway processor 808, without having to maintain relationships with multiple acquiring financial institutions 810 and payment processors and the hardware associated thereto. Acquiring financial institutions 810 may be financial institutions, such as banks, or other entities that administers and manages payment accounts and/or payment instruments for use with payment accounts. In some instances, acquiring financial institutions 810 may manage transaction accounts for merchants 806. In some cases, a single financial institution may operate as both an issuing financial institution 802 and an acquiring financial institution 810.

The data signal transmitted from the merchant 806 to the gateway processor 808 may be superimposed with the transaction details for the payment transaction, which may be formatted based on one or more standards. In some embodiments, the standards may be set forth by the gateway processor 808, which may use a unique, proprietary format for the transmission of transaction data to/from the gateway processor 808. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 808.

In step 828, the gateway processor 808 may parse the transaction data signal to obtain the transaction data superimposed thereon and may format the transaction data as necessary. The formatting of the transaction data may be performed by the gateway processor 808 based on the proprietary standards of the gateway processor 808 or an acquiring financial institution 810 associated with the payment transaction. The proprietary standards may specify the type of data included in the transaction data and the format for storage and transmission of the data. The acquiring financial institution 810 may be identified by the gateway processor 808 using the transaction data, such as by parsing the transaction data (e.g., deconstructing into data elements) to obtain an account identifier included therein associated with the acquiring financial institution 810. In some instances, the gateway processor 808 may then format the transaction data based on the identified acquiring financial institution 810, such as to comply with standards of formatting specified by the acquiring financial institution 810. In some embodiments, the identified acquiring financial institution 810 may be associated with the merchant 806 involved in the payment transaction, and, in some cases, may manage a transaction account associated with the merchant 806.

In step 830, the gateway processor 808 may electronically transmit a data signal superimposed with the formatted transaction data to the identified acquiring financial institution 810. The acquiring financial institution 810 may receive the data signal and parse the signal to obtain the formatted transaction data superimposed thereon. In step 832, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 806 involved in the payment transaction is requesting payment or a promise of payment from the issuing financial institution 802 for the transaction. The authorization request may include a plurality of data elements, each data element being configured to store data as set forth in the associated standards, such as for storing an account number, application cryptogram, transaction amount, issuing financial institution 802 information, etc.

In step 834, the acquiring financial institution 810 may electronically transmit the authorization request to a transaction processing server 812 for processing. The transaction processing server 812 may be comprised of one or more computing devices as part of a payment network configured to process payment transactions. In some embodiments, the authorization request may be transmitted by a transaction processor at the acquiring financial institution 810 or other entity associated with the acquiring financial institution. The transaction processor may be one or more computing devices that include a plurality of communication channels for communication with the transaction processing server 812 for the transmission of transaction messages and other data to and from the transaction processing server 812. In some embodiments, the payment network associated with the transaction processing server 812 may own or operate each transaction processor such that the payment network may maintain control over the communication of transaction messages to and from the transaction processing server 812 for network and informational security.

In step 836, the transaction processing server 812 may perform value-added services for the payment transaction. Value-added services may be services specified by the issuing financial institution 802 that may provide additional value to the issuing financial institution 802 or the consumer 804 in the processing of payment transactions. Value-added services may include, for example, fraud scoring, transaction or account controls, account number mapping, offer redemption, loyalty processing, etc. For instance, when the transaction processing server 812 receives the transaction, a fraud score for the transaction may be calculated based on the data included therein and one or more fraud scoring algorithms and/or engines. In some instances, the transaction processing server 812 may first identify the issuing financial institution 802 associated with the transaction, and then identify any services indicated by the issuing financial institution 802 to be performed. The issuing financial institution 802 may be identified, for example, by data included in a specific data element included in the authorization request, such as an issuer identification number. In another example, the issuing financial institution 802 may be identified by the primary account number stored in the authorization request, such as by using a portion of the primary account number (e.g., a bank identification number) for identification.

In step 838, the transaction processing server 812 may electronically transmit the authorization request to the issuing financial institution 802. In some instances, the authorization request may be modified, or additional data included in or transmitted accompanying the authorization request as a result of the performance of value-added services by the transaction processing server 812. In some embodiments, the authorization request may be transmitted to a transaction processor (e.g., owned or operated by the transaction processing server 812) situated at the issuing financial institution 802 or an entity associated thereof, which may forward the authorization request to the issuing financial institution 802.

In step 840, the issuing financial institution 802 may authorize the transaction account for payment of the payment transaction. The authorization may be based on an available credit amount for the transaction account and the transaction amount for the payment transaction, fraud scores provided by the transaction processing server 812, and other considerations that will be apparent to persons having skill in the relevant art. The issuing financial institution 802 may modify the authorization request to include a response code indicating approval (e.g., or denial if the transaction is to be denied) of the payment transaction. The issuing financial institution 802 may also modify a message type indicator for the transaction message to indicate that the transaction message is changed to be an authorization response. In step 842, the issuing financial institution 802 may transmit (e.g., via a transaction processor) the authorization response to the transaction processing server 812.

In step 844, the transaction processing server 812 may forward the authorization response to the acquiring financial institution 810 (e.g., via a transaction processor). In step 846, the acquiring financial institution may generate a response message indicating approval or denial of the payment transaction as indicated in the response code of the authorization response, and may transmit the response message to the gateway processor 808 using the standards and protocols set forth by the gateway processor 808. In step 848, the gateway processor 808 may forward the response message to the merchant 806 using the appropriate standards and protocols. In step 850, assuming the transaction was approved, the merchant 806 may then provide the products purchased by the consumer 804 as part of the payment transaction to the consumer 804.

In some embodiments, once the process 800 has completed, payment from the issuing financial institution 802 to the acquiring financial institution 810 may be performed. In some instances, the payment may be made immediately or within one business day. In other instances, the payment may be made after a period of time, and in response to the submission of a clearing request from the acquiring financial institution 810 to the issuing financial institution 802 via the transaction processing server 812. In such instances, clearing requests for multiple payment transactions may be aggregated into a single clearing request, which may be used by the transaction processing server 812 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 840), the transaction processing server 812 may be configured to perform authorization of transactions on behalf of the issuing financial institution 802. Such actions may be referred to as "stand-in processing," where the transaction processing server "stands in" as the issuing financial institution 802. In such instances, the transaction processing server 812 may utilize rules set forth by the issuing financial institution 802 to determine approval or denial of the payment transaction, and may modify the transaction message accordingly prior to forwarding to the acquiring financial institution 810 in step 844. The transaction processing server 812 may retain data associated with transactions for which the transaction processing server 812 stands in, and may transmit the retained data to the issuing financial institution 802 once communication is reestablished. The issuing financial institution 802 may then process transaction accounts accordingly to accommodate for the time of lost communication.

In another example, if the transaction processing server 812 is unavailable for submission of the authorization request by the acquiring financial institution 810, then the transaction processor at the acquiring financial institution 810 may be configured to perform the processing of the transaction processing server 812 and the issuing financial institution 802. The transaction processor may include rules and data suitable for use in making a determination of approval or denial of the payment transaction based on the data included therein. For instance, the issuing financial institution 802 and/or transaction processing server 812 may set limits on transaction type, transaction amount, etc. that may be stored in the transaction processor and used to determine approval or denial of a payment transaction based thereon. In such instances, the acquiring financial institution 810 may receive an authorization response for the payment transaction even if the transaction processing server 812 is unavailable, ensuring that transactions are processed and no downtime is experienced even in instances where communication is unavailable. In such cases, the transaction processor may store transaction details for the payment transactions, which may be transmitted to the transaction processing server 812 (e.g., and from there to the associated issuing financial institutions 802) once communication is reestablished.

In some embodiments, transaction processors may be configured to include a plurality of different communication channels, which may utilize multiple communication cards and/or devices, to communicate with the transaction processing server 812 for the sending and receiving of transaction messages. For example, a transaction processor may be comprised of multiple computing devices, each having multiple communication ports that are connected to the transaction processing server 812. In such embodiments, the transaction processor may cycle through the communication channels when transmitting transaction messages to the transaction processing server 812, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 810 may identify that an authorization request involves an issuing financial institution 802 (e.g., via the bank identification number included in the transaction message) for which no value-added services are required. The transaction processor at the acquiring financial institution 810 may then transmit the authorization request directly to the transaction processor at the issuing financial institution 802 (e.g., without the authorization request passing through the transaction processing server 812), where the issuing financial institution 802 may process the transaction accordingly.

The methods discussed above for the processing of payment transactions that utilize multiple methods of communication using multiple communication channels, and include fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 812 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 808, acquiring financial institution 810, etc.) for processing using this advanced network, and to quickly and efficiently receive a response regarding the ability for a consumer 804 to fund the payment transaction.

Computer System Architecture

Figure 9:
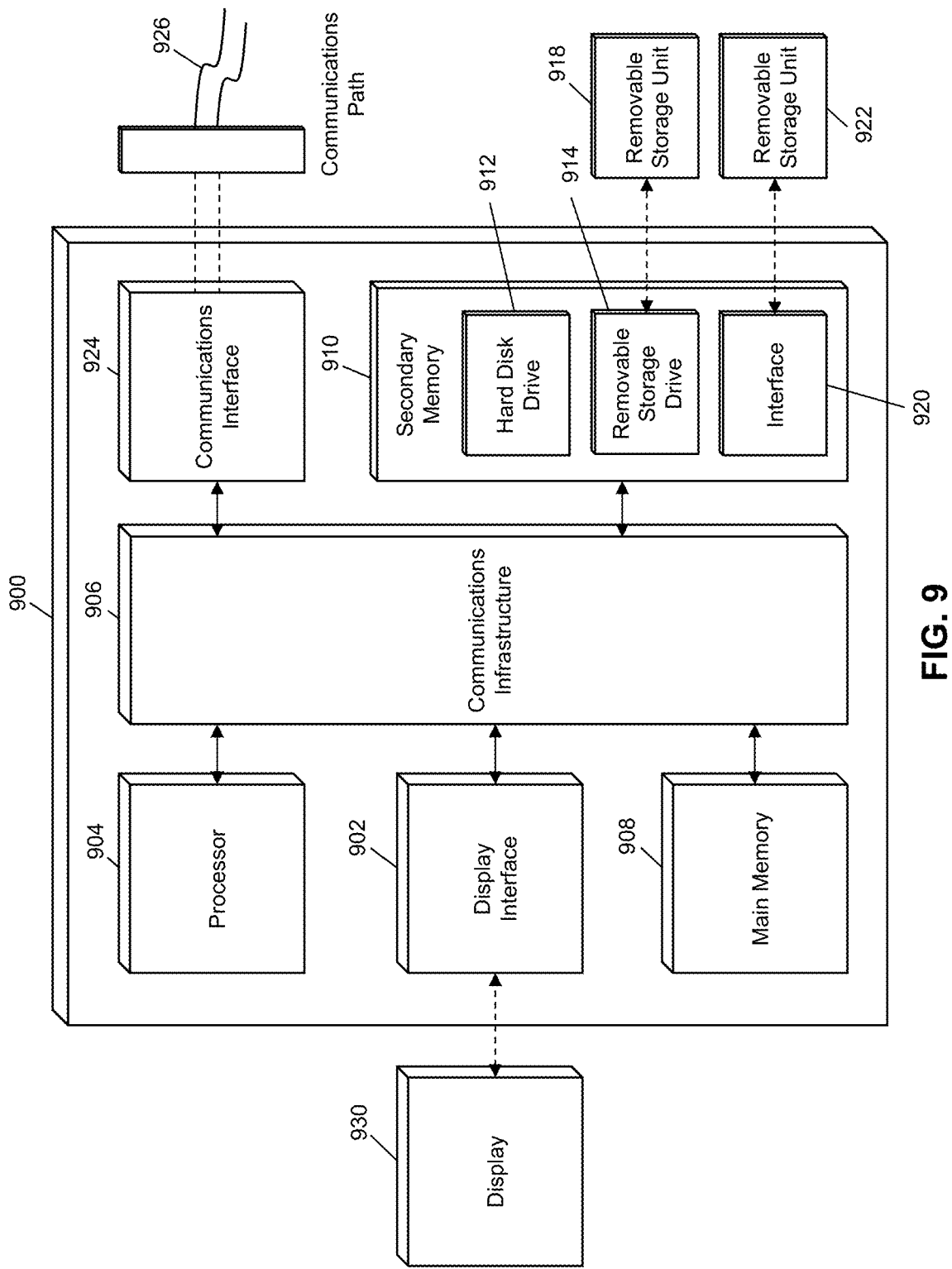
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the payment card 102 and point of sale device 104 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-8.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900.

After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device specifically configured to perform the functions discussed herein. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3-8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for providing scripts for execution and providing prompted data as part of electronic payment transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing scripts for execution as part of an electronic payment transaction, comprising:
    establishing, by an integrated circuit payment card, a communication channel between a point of sale device of a merchant and the integrated circuit payment card;
    storing, in a memory of the integrated circuit payment card, at least one or more executable scripts, payment credentials, and a cryptogram rule, wherein each executable script of the at least one or more executable scripts is associated with an identifier;
    receiving, by a receiving device of the integrated circuit payment card, a transaction request from the point of sale device via the established communication channel, wherein the transaction request includes at least one or more transaction items and a script request;
    generating, by a generation module of the integrated circuit payment card, at least one payment cryptogram based on at least the cryptogram rule and at least one of the one or more transaction items included in the transaction request; and
    electronically transmitting, by a transmitting device of the integrated circuit payment card, as part of the electronic payment transaction, to the point of sale device, (i) at least one executable script of the one or more executable scripts, (ii) the payment credentials, and (iii) the generated at least one payment cryptogram, wherein the at least one executable script includes a data message regarding what data is being requested from a consumer and specifying a data type and data size for a response from the consumer, and wherein said at least one executable script is customizable by at least an authorized user and a financial institution associated with the integrated circuit payment card,
    wherein upon receiving the at least one executable script of the at least one executable script, the point of sale device executes each executable script of the at least one executable script and transmits a transaction message, generated by the point of sale device, to an acquiring institution associated with the merchant for generation of an authorization request, wherein the transaction message includes (i) at least one data element storing data values associated with responses to customized prompts for data displayed on a display device of the point of sale, and (ii) the identifier associated with each of the at least one executable scripts.

2. The method of claim 1, wherein the script request is a flag indicating that the at least one of the one or more executable scripts is requested.

3. The method of claim 1, wherein the one or more executable scripts further includes one or more response formatting rules.

4. The method of claim 3, wherein the one or more response formatting rules includes at least a data type and a data size.

5. The method of claim 1, wherein the integrated circuit payment card is a fleet card.

6. A system for providing scripts for execution as part of an electronic payment transaction, comprising:
    a processor of an integrated circuit payment card configured to establish a communication channel between a point of sale device and the integrated circuit payment card;
    a memory of the integrated circuit payment card configured to store at least one or more executable scripts, payment credentials, and a cryptogram rule, wherein each executable script of the at least one or more executable scripts is associated with an identifier;
    a receiving device of the integrated circuit payment card configured to receive a transaction request from the point of sale device via the established communication channel, wherein the transaction request includes at least one or more transaction items and a script request;
    a generation module of the integrated circuit payment card configured to generate at least one payment cryptogram based on at least the cryptogram rule and at least one of the one or more transaction items included in the transaction request; and
    a transmitting device of the integrated circuit payment card configured to electronically transmit, as part of the electronic payment transaction, to the point of sale device, (i) at least one executable script of the one or more executable scripts, (ii) the payment credentials, and (iii) the generated at least one payment cryptogram, wherein the at least one executable script includes a data message regarding what data is being requested from a consumer and specifying a data type and data size for a response from the consumer, and wherein said at least one executable script is customizable by at least an authorized user and a financial institution associated with the integrated circuit payment card,
    wherein upon receiving the at least one executable script of the at least one executable script, the point of sale device executes each executable script of the at least one executable script and transmits a transaction message, generated by the point of sale device, to an acquiring institution associated with the merchant for generation of an authorization request, wherein the transaction message includes (i) at least one data element storing data values associated with responses to customized prompts for data displayed on a display device of the point of sale, and (ii) the identifier associated with each of the at least one executable scripts.

7. The system of claim 6, wherein the script request is a flag indicating that the at least one of the one or more executable scripts is requested.

8. The system of claim 6, wherein the one or more executable scripts further includes one or more response formatting rules.

9. The system of claim 8, wherein the one or more response formatting rules includes at least a data type and a data size.

10. The system of claim 6, wherein the integrated circuit payment card is a fleet card.

* * * * *